(12) United States Patent
Kailash et al.

(10) Patent No.: US 7,894,350 B2
(45) Date of Patent: Feb. 22, 2011

(54) GLOBAL NETWORK MONITORING

(75) Inventors: Kailash Kailash, San Jose, CA (US);
Jay Chaudhry, Saratoga, CA (US)

(73) Assignee: Zscaler, Inc., Sunnyvale, CA (US)

( * ) Notice: Subject to any disclaimer, the term of this patent is extended or adjusted under 35 U.S.C. 154(b) by 109 days.

(21) Appl. No.: 12/178,911

(22) Filed: Jul. 24, 2008

(65) Prior Publication Data
US 2010/0020700 A1    Jan. 28, 2010

(51) Int. Cl.
*H04L 12/26* (2006.01)
(52) U.S. Cl. .......................................... 370/242; 726/25
(58) Field of Classification Search ......... 370/241–246; 709/223–226; 726/22–25; 713/150–181
See application file for complete search history.

(56) References Cited

U.S. PATENT DOCUMENTS

| 5,974,149 A | 10/1999 | Leppek |
| 5,991,881 A | 11/1999 | Conklin et al. |
| 2004/0181664 A1* | 9/2004 | Hoefelmeyer et al. ....... 713/157 |
| 2007/0245420 A1* | 10/2007 | Yong et al. ..................... 726/23 |
| 2008/0034425 A1* | 2/2008 | Overcash et al. .............. 726/22 |
| 2008/0250497 A1* | 10/2008 | Mullarkey et al. ............ 726/22 |
| 2008/0263661 A1* | 10/2008 | Bouzida ....................... 726/22 |
| 2008/0295172 A1* | 11/2008 | Bohacek ....................... 726/23 |

FOREIGN PATENT DOCUMENTS

| KR | 10-2004-0036228 A | 4/2004 |
| KR | 10-2005-0090640 A | 9/2005 |

OTHER PUBLICATIONS

Transmittal of the International Search Report and the Written Opinion on the International Search Authority, or the Declaration, PCT/US/2009/05162, filed Jan. 27, 2010, 11 pages.

* cited by examiner

*Primary Examiner*—Ricky Ngo
*Assistant Examiner*—Gary Mui
(74) *Attorney, Agent, or Firm*—Fish & Richardson P.C.

(57) ABSTRACT

Systems, methods and apparatus monitor networks to identify when the networks are not operating normally, for instance, because of malware. During a sample interval sample data is collected that corresponds to a plurality of system activities, the sample data collected from a plurality of monitored networks and representing normal operations of the plurality of monitored networks. Subsequent to the sample interval, observed data is collected from the plurality of monitored networks, the observed data corresponding to at least some of the system activities. A determination is made whether the observed data represents the normal operation of the monitored networks, and an alert is generated if the observed data does not represent the normal operation of the monitored networks.

25 Claims, 3 Drawing Sheets

GLOBAL NETWORK MONITORING

BACKGROUND

This disclosure relates to network monitoring.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., malware detection software on each computer device within the enterprise, content filtering software, content monitoring software, etc.

Existing methods of detecting malicious code outbreaks in computer networks are based on measuring a set of parameters and checking whether the parameters exceed a pre-defined threshold value. When this occurs malicious code is inferred. For example, the measurement parameters used are based on the number of e-mail messages sent a) with the same subject, b) with executable attachments, c) with identical file attachments, and d) with executable attachments of the same type. Another measure used is e-mail throughput, which is the product of the number of messages and the size of the message measured per unit quantum of time. Another technique is based on the number of e-mail messages generated in response to the arrival of an e-mail message. If the number of generated e-mails exceed a threshold, then a virus outbreak may be inferred.

Advancements in malware detection technology and malware propagation techniques provide an opportunity for better outbreak detection systems. For instance, a recent advancement is the use of ABM (Application Behavior Monitoring) to signal the presence of malware by monitoring abnormal patterns of events at each host system, allowing hosts to raise alarms for the events (including false alarms), aggregating alarms from multiple clients in steps of progressively increasing threshold levels. Examples of such events are deleting files, receiving infecting files, modifying registry keys, creating auto-run configurations, creating and modifying file-association registry keys, creating registry markers, creating shared folders, reading passwords, recording keyboard events, gathering email addresses, sending system related information, etc. However, such monitoring signals can be obtained only from infected hosts.

Other malware detection systems employ a distributed collection of virus scanning software coupled with an agent to report abnormal results to a centralized server. These results are progressively aggregated to create an outbreak alert system. The system has the disadvantage that only existing viruses can be detected through signature based scanning. Another disadvantage is the inability of virus scanning software from different vendors to inter-operate.

Malware detection engines that work on content inspection alone have fewer parameters to detect abnormal activity. In a host based malware detection system as seen in prior art, complete system activity is captured by the malware engine. Host based systems or collections of them cannot be used as they cannot handle large number of transactions even with a large collection of hosts. Secondly, execution of subscriber content may affect the privacy and confidentiality of the subscriber. Additionally, advanced malware can employ techniques such as root kits to hide from host based anti-virus systems altogether, making any statistical analysis by such systems meaningless.

SUMMARY

The subject matter described in this specification is directed to system monitoring. Methods, systems, and computer program products monitor a large number of parameters on many networks, including global networks, and create alerts for outbreak events. A distributed system of processing nodes, logging nodes, and authorizing nodes are coordinated through a central authority node (CAN). The CAN is able to monitor system health at system, region and geographic levels. Health of the system is monitored through a collection of system activity data sampled at fine intervals of time. Using the health information and by observing its abnormality, the system detects virus and spam outbreaks and targeted attack patterns.

In general, one aspect of the subject matter described in this specification can be embodied in methods that include collecting sample data, during a sample interval, corresponding to a plurality of system activities, where the sample data is collected from a plurality of monitored networks and representing normal operations of the plurality of monitored networks. Subsequent to the sample interval, observed data is collected from the plurality of monitored networks, where the observed data corresponding to at least some of the plurality of system activities. The method determines if the observed data represents the normal operation of the monitored networks, and an alert is generated when the observed data does not represent the normal operation of the monitored networks. Other implementations of this aspect include corresponding systems, apparatus, and computer program products.

According to one feature, determining if the observed data represents the normal operation of the monitored networks includes comparing the observed data to the sample data. According to another feature, determining if the observed data represents the normal operation of the monitored networks includes comparing the observed data to one or more threshold values representing one or more acceptable values of sample data during the normal operation of the plurality of monitored networks. The plurality of system activities can identify operating system activity, network events, or content inspection events. According to yet another feature, the sample data can be collected approximately 1-10 times per second from each of the plurality of monitored networks, which can collectively comprise a global network. The plurality of monitored networks can be distributed across a wide geographical area.

According to another feature, generating an alert can include generating an alert to an administrator associated with at least one of the plurality of networks. An alert can include an e-mail or instant message. Generating an alert can also include taking corrective action to prevent an activity that is causing generation of the observed data that does not represent the normal operation of the monitored networks. According to yet another feature, the sample data identifies the occurrence of a network redirection, a number of traffic redirections, an occurrence of a policy violation, a number of policy violations, a direction of detected malware, a number of error pages, or a volume of malware.

The subject matter described in this specification also includes other aspects. One or more of the following advantages can be realized by implementations of the subject matter described in this specification. The health of a plurality of networks over a wide geographical area can be constantly or routinely monitored by the CAN, which is external to those networks and thus protected against malicious activity that can negatively impact those networks. The CAN take corrective action to correct or reduce malicious activity, or can generate an alert to one or more system administrators that the systems are not operating normally because of suspected malicious activity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
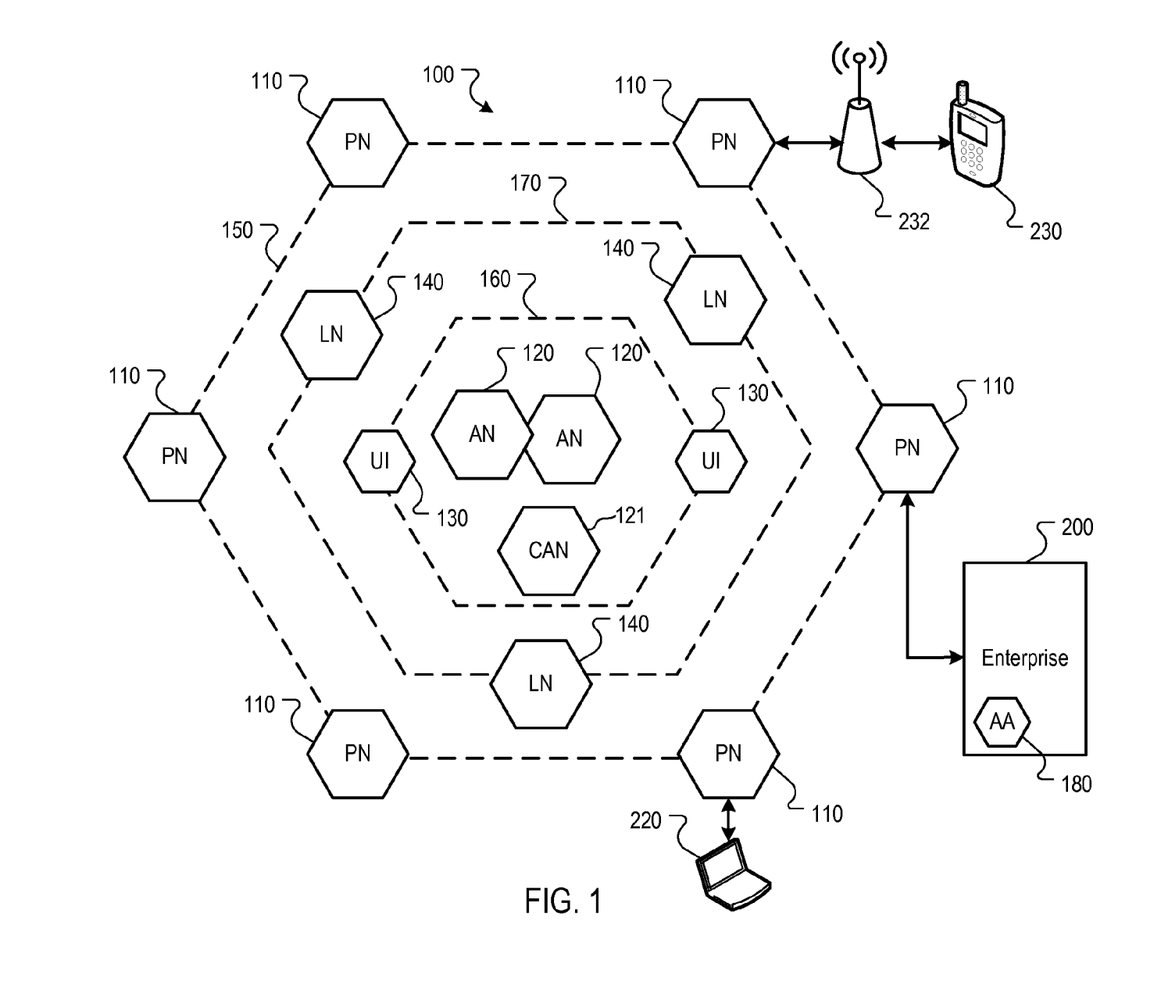
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security and performance threats, e.g., malware, sent from or requested by an external system. Example external systems can include an enterprise 200, a computer device 220, and a mobile device 230, or other network and computing systems.

The term malware is used throughout the present disclosure to include any undesirable content that can pose a security risk or negatively impact the performance of a computing device, including, for instance, viruses, spyware, and spam.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d_1, d_2, \ldots, d_n]$ for a content item of one or more parts $C=[c_1, c_2, \ldots, c_m]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if for any part $C=[c_1, c_2, \ldots, c_m]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

The system 100 also includes a central authority node (CAN) 121 that coordinates each of the processing nodes 110 and logging nodes 140. The CAN 121 can perform all of the functions of an authority node 120. According to some implementations, the CAN 121 can be an authority node 120. Thus, although illustrated as a separate component from the authority nodes 120, the CAN 121 may represent one such authority node 120. The CAN 121 can act as a master authority node by receiving data corresponding to system activity from each of the processing nodes 110 and logging nodes 140, which are each operable to forward the data to the CAN 121.

In some implementations thousands of system activities can be monitored at predefined intervals within each of the of the systems monitored by the processing nodes 110 and logging nodes 140. Data corresponding to at least some of the system activity is communicated from the processing nodes 110 and logging nodes 140 to the CAN 121. For instance, data corresponding to a few hundred system activities can be routinely communicated to the CAN. System activities can include operating system activity (e.g., disk I/O, File I/O, System Call), network events (e.g., packets received, packets sent, retransmissions, errors), and/or content inspection events (e.g., operation of anti-virus software, the occurrence or results of content inspection).

As described in greater detail below, the CAN 121 receives data corresponding to system activity from multiple networks during normal operation of the networks. The CAN 121 thus allows collection and monitoring of data from multiple, aggregated networks over a wide geographical distance. That data is stored and accessible by the CAN 121 for comparison to data collected corresponding to subsequent system activity. When the subsequent data falls outside of parameters based on the data representing normal operation of the networks, the CAN 121 can generate an alert.

An alert can be to an administrator associated with the system 100 or one or more of the networks, and can be an e-mail, instant message, or the like. An alert can also include corrective action to prevent activity that is causing generation of the data that does not represent the normal operation of the monitored networks.

Other application layer functions within the system 100 can be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, chose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§2.3 Example CAN Architecture

Figure 2:
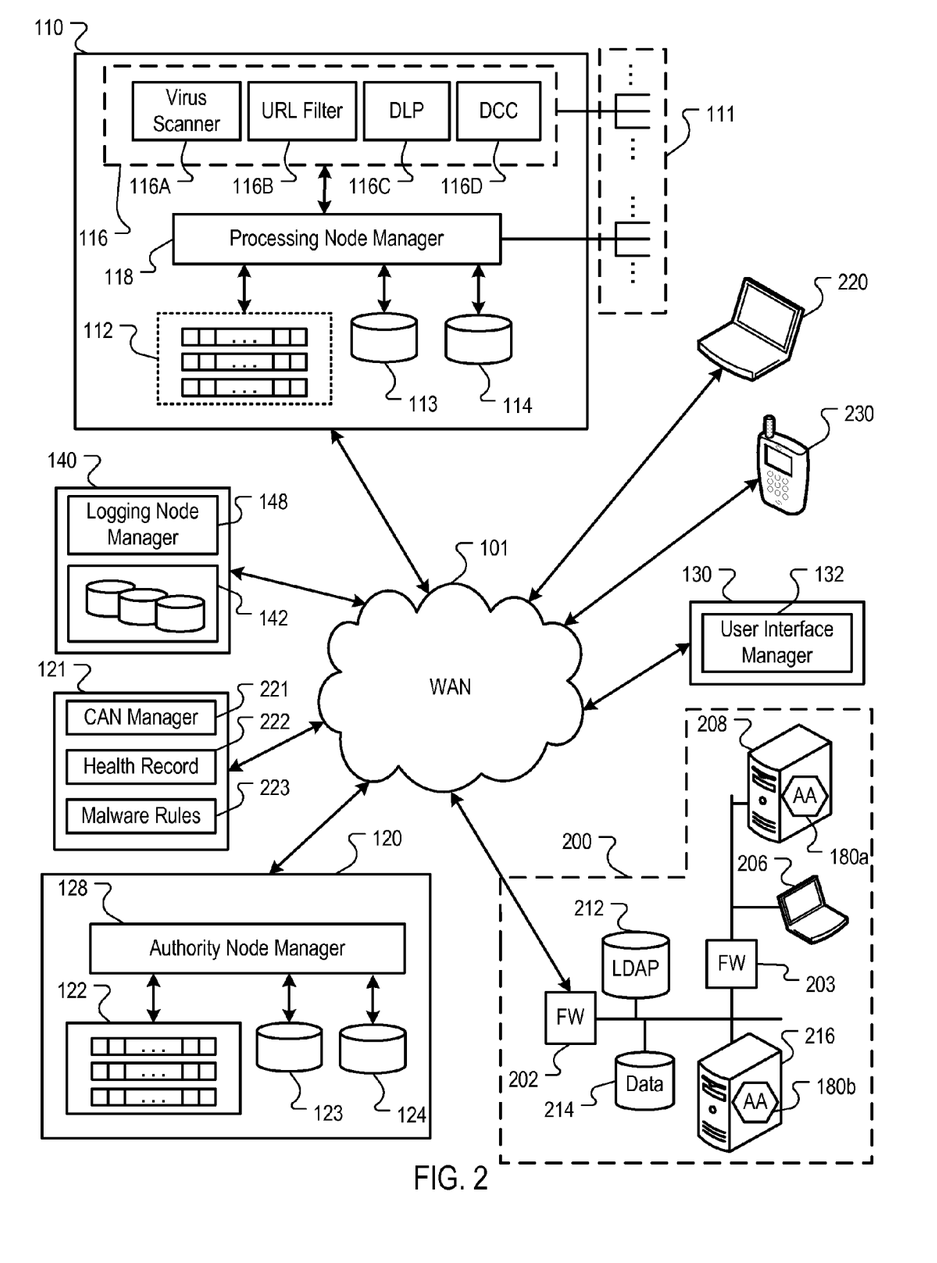
FIG. 2 is a block diagram of the system of FIG. 1 in which the components of FIG. 1 are illustrated in more detail.

The CAN 121 coordinates each of the processing nodes 110, and logging nodes 140. As described above, according to an implementation, the CAN 121 can represent an authority node 120. Thus, the CAN 121 can perform all of the functions of an authority node 120 and can receive data corresponding to system activity from each of the processing nodes 110 and logging nodes 140.

The CAN 121 includes a CAN manager 221 for managing the operations of the CAN. Because the CAN 121 can represent an authority node 120, in some implementations the CAN manager 221 may be implemented or be the same as the authority node manager 128. The CAN manager 221 can facilitate the collection and/or receipt of data corresponding to system activities from each of the processing nodes 110, logging nodes 140, and authority nodes 120. The data can be stored in a heath record 222. In implementations where the CAN 121 is an authority node, the health record 222 can exist within the authority node 120. According to some implementations, the CAN manager 221 can store data representing changes in system state within the health record 222. The health record 222 can, for instance, be implemented via one or more tables.

According to some implementations, the CAN manager 221 can collect data (e.g., sample data) during a sampling interval in which the network is operating under normal conditions. The sample data can be collected at sampling intervals that capture small changes in the network, such as at 1-10 samples per second for each system activity occurring at each node in the system. The sample data can be stored in the health record 222. According to some implementations the CAN manager can 221 use the sample data to generate and store one or more threshold values that indicate the range of possible activities that are considered normal.

For instance, for a particular system activity the CAN manager 221 can identify maximum or minimum threshold values from the sample data, where the threshold values representing the range of acceptable values for the system to be considered operating normally. Threshold values can be stored for each type of activity such that collection of subsequent data during system monitoring can be compared against the values by the CAN manager 221 to determine if the system is operating normally.

After the sampling interval is complete, the CAN manager 221 can collect data (e.g., observed data) to monitor the health of the network and to identify when malicious activity may be taking place. The observed data can be collected at intervals that capture small changes in the network, such as at 1-10 samples per second for each system activity occurring at each node in the system. In some implementations the observed data can be stored in the health record 222.

The CAN 221 determines if the observed data represents the normal operation of the monitored networks based on malware rules 223 that instructs the CAN manager 221 on whether the observed data indicates that the network is operating within a normal range based on the sample data. In implementations where the CAN 121 is an authority node 120, the malware rules 223 can exist within the authority node 120. As an example, the malware rules 223 may indicate that the system is operating normally when the observed data falls within a certain range or percentage of an average of sample data for a particular system activity. For instance, if during a sample interval of 10 seconds there are 10 web-site redirections, and during a subsequent observed interval of 10 seconds there are 11 web-site redirections, then the malware rules 223 may indicate that the system is operating under normal conditions. On the other hand, during a subsequent observed interval of 10 seconds there are 20 web-site redirections, then the malware rules 223 may indicate that malicious activity has been detected. Thus, the CAN manager 221 can determine if the observed data represents the normal operation of the monitored networks by comparing the observed data to sample data using one or more malware rules. According to some implementations, the malware rules can identify one or more threshold values representing one or more acceptable values, ranges, or percentages of sample data during the normal operation of the plurality of monitored networks.

According to some implementations, the CAN manager 221 will update the health record 222 only with changes in observed data. For instance, if many system activities do not change during system monitoring, data for those activities are not constantly updated by the CAN manager 221. By updating only changed data the CAN manager 221 minimizes the processing and read/write activities required to maintain the health record 222 and monitor the system 100.

According to some implementations the nodes will not transmit observed data to the CAN 121 when the data is unchanged from a previous interval, or changed by a minimum amount. The CAN 121 can be configured to transmit rules to the nodes instructing each when minimal or no observed data needs to be transmitted to the CAN 121, thus reducing the amount of network traffic required to identify malicious activity. For instance, the CAN 121 can instruct logging nodes not to report observed data for each system activity where the data is within 5% of the previous value of such system activity.

Using the health records 222 and malware rules 223, the CAN manger 221 can detect the status of each node in the system (e.g., live, congested, idle, busy), malicious code outbreaks by observing changes in system activity data (e.g., the number of viruses detected are higher than normal), and virus flow detection. When the observed data indicates that the networks are not operating normally (i.e., within a normal operating range as provided by the sampling data), the CAN 121 can generate an alert. An alert can be communicated to an administrator associated with the system 100 or one or more of the networks, and can be an e-mail, instant message, or the like. An alert can also include corrective action to prevent activity that is causing generation of the data that does not represent the normal operation of the monitored networks.

§3.0 Global System Monitoring

As described above, the distributed system of processing nodes, logging nodes, and authorizing nodes can be coordinated through a CAN 121. The CAN 121 monitors system health at system, region and geographic levels. After sampling data is collected for a large number of system activities across networks, observed data is collected for some or all of those system activities at fine intervals of time. Using the observed data the CAN detects abnormalities in the system, such as virus and spam outbreaks and targeted attack patterns.

A large number of system activities (e.g., in the thousands) can be tracked and monitored at a predefined interval in each of the nodes and their corresponding networks. Data corresponding to a subset (e.g., a few hundred) of these activities are communicated to the CAN 121 for use in monitoring the health of the nodes and identifying the outbreak of virus, spam and other undesirable network traffic in networks connected to the nodes.

§3.0.1 Identifying Abnormal System Activities

Abnormalities in the system are identified by the CAN manager 221 due to a sudden increase in certain system activities, such as an increase in the detection of malware, viruses, spam, bad content, and the like. These malware activities are indicated by a number of system activities collected in the observed data by the CAN 121.

A first system activity are redirects identified within processing nodes at regional, country, and global levels. Observed data can include the number of such redirects. Malware infection can be detected by monitoring the redirection of request to new locations. Although there may be legitimate redirects, the CAN 121 is configured to identify deviation from a 'normal' number of redirects for a certain predefined number of web transactions collected during a sampling interval. Such as deviation can indicate malicious activity and abnormal operation of one or more networks where the redirections occur. For instance, the malware rules 223 within the CAN 121 may indicate that a 25% increase in redirects over a particular time period is indicative of a malware infection (i.e., malware activity).

Another system activity is a policy violation. Observed data can include the number of policy violations occurring within a network. For instance, a policy violation can occur when an employee is accessing a web site that the employee is not supposed to visit due to his or her company's policies. Typically, the number of such policy violations is marginal and consistent. Sudden changes in the number of policy violations can be used as an indicator of malicious activity and can be identified by the CAN 121 through collection of observed data and comparison to the 'normal' number of policy violations during a sampling interval taken during normal operation of the system. The comparison can be executed using malware rules 223 that indicates whether a change in volume provided by a comparison of the observed data and sample data is indicative of a malware infection.

Yet another system activity that can be monitored by the CAN 121 is the operation of malware. Observed data can include the volume of malware detected at each node. According to some implementations, malware can be detected at each node by a virus scan. The CAN 121 can identify sudden increases in malware by comparing the observed volume of malware with sample volume of malware for a same time interval during normal operation of the system. As discussed above, whether an increase in the volume of malware is deemed a malware infection is based on malware rules 223. In some implementations, observed data can also include the direction of malware (upload vs. download) that is detected. The CAN 121 can identify spikes in uploading or downloading of malware. The variation of volume of malware detected in the outbound traffic in proportion to the inbound traffic can also be monitored. For instance, the CAN 121 can identify a malware infection when a sudden increase in outbound traffic occurs with respect to inbound traffic, which could be based on a the attack of many hosts from a single infected host.

Another system activity is the serving of error pages. Observed data including the number of error pages returned may be tracked to identify potential malicious activity. For instance, a spike in the number of observed error pages as compared to the expected number of error pages may be presumed to be the result of malicious activity.

Yet another system activity is the serving of web pages having a particular category. For instance, observed data can include the number of web pages served or accessed having a particular classification, such as 'infected'. A sudden increase in the number of infected web pages served, for instance, may result in the CAN 121 identifying malicious activity. Additionally, sudden changes in the category of sites (detected by the content inspection engines) reported may be indicative of malicious activity.

Observed data for web pages may also include web page classifications based on URL and based on web page content. The malware rules 223 may be configured to deem that an inconsistency in these classifications may be indicative of suspicious activity, and malware rules 223 can indicate that a particular volume of such inconsistencies is indicative of malware activity. Yet additional observed web page related data is a change in the category of top 'N' sites over any period of time. Because malicious activities can 'phone-home' and connect to similar servers, sudden activity resulting in unknown or malware categories of URLs falling within the top 'N' accessed and/or requested sites may be deemed to indicate a malware outbreak. Thus, the identification of possible malware activity may be based on detecting web site abnormalities over time, and/or on the abnormality of website requests over time. Both types of abnormalities are captured by the CAN 121.

§3.0.2 Variations in Observations of Abnormalities

As described above, the CAN 121 uses malware rules 223 to identify if one or more networks within the system are subject to malicious activity. Because malicious activity leads to abnormal statistical records, the malware rules can identify possible malicious activity through a comparison of statistical and observed data. Although described above with respect to example system activities where observed data for a single system activity can result in the presumption of malicious activity, the malware rules 223 may require a cumulative number of instances, over a period of time, in which observed data vary from an expected range, percentage, average, mean (or the like) from sample data.

According to some implementations, abnormalities in observed data identified by the malware rules 223 are counted and tracked as a time series. Three types of abnormalities may be indicative of a malware outbreak. First, a mild increase in a statistical activity followed by a sporadic increase in another statistical activity after a period of time may be indicative of malicious activity. Secondly, multiple sets of abnormal activities spaced in time may indicate malicious activity. An example of this kind occurs when malicious activity is prevented by the security policies which block malicious content. A third type of outbreak pattern occurs when there is a single, sudden peak in a particular activity. This can occur, for instance, where security policies of a company are not strong enough to protect against an attack. When malware is propagated by a chain of activities such as a visit to an infected site, this could cause a malicious program such as a back-door or Trojan to be downloaded which in turn downloads other malicious code which then causes other infected sites to be visited. This pattern could produce progressively increasing peaks in observed data for a particular system activity.

The malware rules 223 can be configured, for instance, by a system administrator, to account for each of the above abnormalities that are based on the receipt of observed data at the CAN 121. As an illustrative example, if malware is detected more than 'X' number of times, such as 50, then an alert can be generated.

§3.0.3 Generation of Alerts

When the observed data falls outside of parameters established by the malware rules 223, the CAN 121 can generate an alert. An alert can be to an administrator associated with the system 100 or one or more of the networks, and can be an e-mail, instant message, or the like. An alert can also include corrective action to prevent activity that is causing generation of the data that does not represent the normal operation of the monitored networks.

§4.0 Example Processes of Global Network Monitoring

Figure 3:
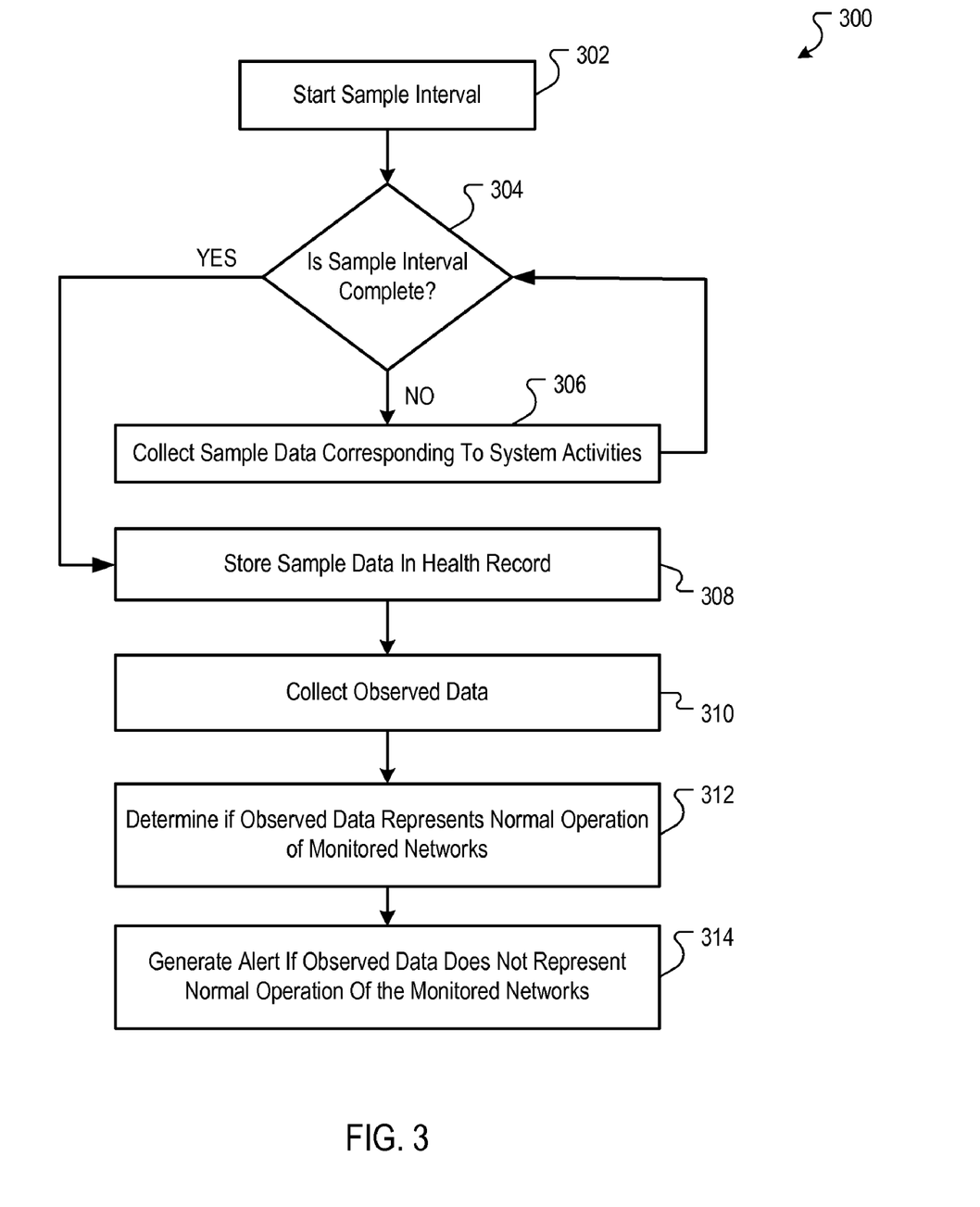
FIG. 3 is a flow diagram of an example process of monitoring a global network.

FIG. 3 is a flow diagram of an example process 300 for providing system monitoring. The process 300 can, for example, be implemented in a CAN 121 in the system 100 of FIGS. 1 and 2. The stages shown in FIG. 3 are each processes that can be executed independently and concurrently as appropriate.

Stages 302, 304, 306 collect sample data during a sample interval. The sample data corresponds to plurality of system activities and is collected from a plurality of monitored networks. The sample data represents normal operations of the plurality of monitored networks. The CAN 121 can, for instance, collect the sample data from nodes within the system that represent the plurality of monitored networks. The sample data is stored in the health record at stage 308.

At stage 310 observed data is collected. The observed data 310 is collected subsequent to the expiration of the sample interval and is used by the system to identify whether malicious activity is taking place. The observed data is collected from the plurality of monitored networks using a push or pull retrieval from nodes representing the monitored networks. The observed data corresponds to at least some of the plurality of system activities. For instance, some but not all of the observed data collected will represent the same system activities as sample data collected during the sample interval.

Next, at stage 312, a determination is made whether the observed data represents the normal operation of the monitored networks. For instance, the CAN 121 can make this determination using malware rules 223. One or more rules are, for instance, applied to identify if the observed data represents a variation or change from sample data corresponding to the same system activities.

At stage 314 an alert is generated if the observed data does not represent the normal operation of the monitored networks. For instance, the CAN manager 121 can generate an alert. Generating an alert can include generating an alert to an administrator associated with at least one of the monitored networks. An alert can include an e-mail or instant message. Generating an alert can also include taking corrective action to prevent an activity that is causing generation of the observed data that does not represent the normal operation of the monitored networks.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method of system monitoring, comprising:
   during a sample interval, collecting sample data corresponding to a plurality of system activities, the sample data collected from a plurality of different processing nodes, each processing node being a node through which a plurality of different enterprise networks communicate over a wide area network, the sample data representing normal operations of the plurality of different enterprise networks, the sample data being collected by an authority node that is in communication with the plurality of different processing nodes;
   subsequent to the sample interval, collecting instances of observed data from the plurality of different enterprise networks, each instance of observed data corresponding to at least some of the plurality of system activities for at least one of the enterprise networks;
   determining, at the authority node, that at least one instance of the observed data represents the normal operation of a corresponding enterprise network and that at least one other instance of the observed data does not represent the normal operation of the corresponding enterprise network;
   generating an alert in response to determining that the observed data does not represent the normal operation of the corresponding enterprise network; and
   logging, for the corresponding enterprise network, only changes in observed data for system activities for which a health status change is indicated by the observed data, the health status change being at least one of a change from normal operation to not normal operation or a change from not normal operation to normal operation.

2. The method of claim 1, wherein determining that the observed data represents the normal operation of a corresponding enterprise network comprises comparing the observed data to the sample data, the comparison being performed by the authority node that is located external to the networks.

3. The method of claim 1, wherein determining that at least one instance of the observed data represents the normal operation of a corresponding enterprise network comprises comparing the observed data to one or more threshold values representing one or more acceptable values of sample data during the normal operation of the plurality of different enterprise networks.

4. The method of claim 3, wherein collecting the sample data comprises aggregating the sample data from the plurality of different processing nodes to determine one or more acceptable values of sample data during the normal operation of the plurality of monitored different enterprise networks.

5. The method of claim 1, wherein the plurality of system activities identify operating system activity, network events, or content inspection events.

6. The method of claim 1, wherein the sample data is collected approximately 1-10 times per second from each of the plurality of different enterprise networks.

7. The method of claim 1, wherein the plurality of different enterprise networks collectively comprise a global network.

8. The method of claim 1, wherein generating an alert comprises generating an alert to an administrator associated with the corresponding enterprise network.

9. The method of claim 8, wherein the alert comprises an e-mail or instant message.

10. The method of claim 1, wherein generating an alert comprises taking corrective action to prevent an activity that is causing generation of the observed data that does not represent the normal operation of the plurality of different enterprise networks.

11. The method of claim 1, wherein the sample data identifies the occurrence of a network redirection, a number of traffic redirections, an occurrence of a policy violation, a number of policy violations, a direction of detected malware, a number of error pages, or a volume of malware.

12. The method of claim 1, wherein:
    the plurality of different enterprise networks are distributed across a wide geographical area,
    the instances of observed data are collected from the plurality of different enterprise networks by the authority node that is located external to the plurality of different enterprise networks, and
    the observed data are only collected from the processing nodes when values of system activity specified by the observed data differ by at least a threshold amount from previous values of the system activity.

13. The method of claim 1, wherein:
    the system activities include observed web page related data that specifies web sites visited over a time period; and
    determining that at least one other instance of the observed data does not represent the normal operation of the corresponding enterprise network comprises determining an abnormality of web-site requests over the time period.

14. The method of claim 13, wherein determining an abnormality of web-site requests over the time period comprises determining that URLs belonging to malware categories are among a top number of N web sites requested over the time period.

15. A monitoring system, comprising:
    a system monitoring service external to network edges of at least one enterprise network system, the system monitoring service including an authority node that is in communications with processing nodes, each processing node being a node through which a plurality of different enterprise networks communicate over a wide area network, the system monitoring service being configured to:

collect sample data from the processing nodes during a sample interval, the sample data corresponding to a plurality of system activities for the plurality of different enterprise networks, the sample data collected by the authority node and representing normal operations of the plurality of monitored networks;

collect instances of observed data from the processing nodes subsequent to the sample interval, the instances of observed data being collected from the processing nodes for the plurality of different enterprise networks, each instance of observed data corresponding to at least some of the plurality of system activities for at least one of the enterprise networks;

determine, using the authority node, that at least one instance of the observed data represents the normal operation of a corresponding enterprise network and that at least one other instance of the observed data does not represent the normal operation of the corresponding enterprise network; and generate an alert in response to determining that the observed data does not represent the normal operation of the corresponding enterprise network; and log, for the corresponding enterprise network, only changes in observed data for which a health status change is indicated by the observed data, the health status change being at least one of a change from normal operation to not normal operation or a change from not normal operation to normal operation.

16. The system of claim 15, wherein the system monitoring service is configured to compare the observed data to the sample data.

17. The system of claim 15, wherein the system monitoring service is configured to compare the observed data to one or more threshold values representing one or more acceptable values of sample data during the normal operation of the plurality of different enterprise networks.

18. The system of claim 15, wherein the plurality of system activities identify operating system activity, network events, or content inspection events.

19. The system of claim 15, wherein the system monitoring service is configured to collect the sample data approximately 1-10 times per second from each of the plurality of different enterprise networks.

20. The system of claim 15, wherein the plurality of different enterprise networks collectively comprise a global network.

21. The system of claim 15, wherein the system monitoring service is configured to generate an alert to an administrator associated with at least one of the plurality of different enterprise networks.

22. The system of claim 21, wherein the alert comprises an e-mail or instant message.

23. The system of claim 15, wherein the system monitoring service is configured to take corrective action to prevent an activity that is causing generation of the observed data that does not represent the normal operation of the plurality of different enterprise networks.

24. The system of claim 15, wherein the sample data identifies the occurrence of a network redirection, a number of traffic redirections, an occurrence of a policy violation, a number of policy violations, a direction of detected malware, a number of error pages, or a volume of malware.

25. The system of claim 15, wherein:
the plurality of different enterprise networks are distributed across a wide geographical area;
the instances of observed data are collected from the plurality of different enterprise networks by an authority node that is located external to the plurality of monitored networks; and
the observed data are only collected from the processing nodes when values of system activity specified by the observed data differ by at least a threshold amount from previous values of the system activity.

* * * * *